United States Patent
Thomas et al.

(10) Patent No.: US 8,854,231 B2
(45) Date of Patent: Oct. 7, 2014

(54) PARKING ASSISTANCE SYSTEM AND METHOD

(75) Inventors: Bijo Thomas, Bangalore (IN); Biju Ravindran, Bangalore (IN)

(73) Assignee: NXP, B.V., Eindhoven (NL)

( * ) Notice: Subject to any disclaimer, the term of this patent is extended or adjusted under 35 U.S.C. 154(b) by 341 days.

(21) Appl. No.: 13/345,214

(22) Filed: Jan. 6, 2012

(65) Prior Publication Data
US 2012/0194355 A1  Aug. 2, 2012

(30) Foreign Application Priority Data

Jan. 28, 2011  (EP) ..................................... 11152575

(51) Int. Cl.
*B60Q 1/48* (2006.01)
*B60R 1/00* (2006.01)
*B60Q 1/00* (2006.01)
*G08G 1/123* (2006.01)
*H04N 7/18* (2006.01)

(52) U.S. Cl.
CPC *B60R 1/00* (2013.01); *H04N 7/181* (2013.01); *B60R 2300/305* (2013.01); *B60R 2300/607* (2013.01); *B60R 2300/806* (2013.01)
USPC ........ 340/932.2; 340/435; 340/461; 701/532; 348/148

(58) Field of Classification Search
CPC .............. H04N 7/18; B60R 1/00; B60R 1/12; B60R 2001/1253; G06K 9/00791
USPC .......................... 340/932.2; 348/148; 701/532
See application file for complete search history.

(56) References Cited

U.S. PATENT DOCUMENTS

| | | | |
|---|---|---|---|
| 5,751,276 | A | 5/1998 | Shih |
| 6,222,447 | B1 | 4/2001 | Schofield et al. |
| 7,158,121 | B2 | 1/2007 | Krajewski et al. |
| 7,684,593 | B2 | 3/2010 | Chinomi |
| 7,734,417 | B2 | 6/2010 | Chinomi et al. |
| 8,138,899 | B2 | 3/2012 | Ghneim |
| 8,330,818 | B2 | 12/2012 | Cheng et al. |
| 8,542,129 | B2 | 9/2013 | Taniguchi et al. |

(Continued)

FOREIGN PATENT DOCUMENTS

| | | |
|---|---|---|
| CN | 101920679 | 12/2010 |
| CN | 101945256 | 1/2011 |

(Continued)

OTHER PUBLICATIONS

"Steering Angle Sensor", retrieved from the Internet at: http://www.bmw-planet.com/diagrams/release/en/zinfo/FMH0101FB-XX3714001.htm.

(Continued)

*Primary Examiner* — Jack K Wang

(57) ABSTRACT

A vehicle parking assistance system is based on presenting a bird's eye view. The display has an input interface such as a touch-input display or a remote input device such as a joystick. In this case, by selecting a desired position on the display (which is presenting an image of an object or location in space for which the driver is wanting to know the range), the user is able to request a distance calculation between the vehicle and that location in space. The distance information can be provided as an audible message and/or as a visual overlay message onto the bird's eye view.

15 Claims, 5 Drawing Sheets

(a)

(b)

(56) References Cited

U.S. PATENT DOCUMENTS

| | | | |
|---|---|---|---|
| 2002/0196340 A1* | 12/2002 | Kato et al. | 348/148 |
| 2003/0137586 A1 | 7/2003 | Lewellen | |
| 2006/0197761 A1* | 9/2006 | Suzuki et al. | 345/427 |
| 2010/0019934 A1 | 1/2010 | Takano | |
| 2010/0259371 A1* | 10/2010 | Wu et al. | 340/435 |
| 2010/0274474 A1 | 10/2010 | Takano | |
| 2011/0210868 A1* | 9/2011 | Yano et al. | 340/932.2 |

FOREIGN PATENT DOCUMENTS

| | | |
|---|---|---|
| DE | 197 41 896 A1 | 4/1999 |
| DE | 10 2008 046214 A1 | 4/2009 |
| EP | 1 102 226 A2 | 5/2001 |
| EP | 1 304 264 A2 | 4/2003 |
| EP | 2 163 458 A2 | 3/2010 |
| EP | 2 481 636 A1 | 1/2011 |
| JP | 6-255423 A | 9/1994 |
| TW | 201014730 A | 10/1997 |

OTHER PUBLICATIONS

Seiya, S. et al. "Wraparound View System for Motor Vehicles", Fujitsu Sci. Tech. J., vol. 46, No. 1, pp. 96-102 (Jan. 2010).

Extended European Search Report for EP Patent Appln. No. 11152575.4 (Jun. 29, 2011).

CN counterpart application 201210015586.X Office Action dated Feb. 8, 2014.

* cited by examiner

PARKING ASSISTANCE SYSTEM AND METHOD

CROSS-REFERENCE TO RELATED APPLICATIONS

This application claims the priority under 35 U.S.C. §119 of European patent application No. 11152575.4, filed on Jan. 28, 2011, the contents of which are incorporated by reference herein.

This invention relates to parking assistance systems.

The invention relates in particular to parking assistance systems that present a bird's eye view (overhead view) of the car and its surroundings to the driver.

A bird's eye view image is an effective aid when parking and in slow driving scenarios.

In such systems, images of the vehicle's surroundings are captured using multiple cameras mounted on the car, and the captured images are processed using image transformation techniques. The transformed images are joined together to form the bird's eye view image of the car and the surroundings, and this image is displayed.

Methods for processing multiple camera images of the vehicle surroundings for display to the driver are well known, for example from the article "Wrap-around view system for motor vehicles" of Shimizu Seiya, Kawai Jun and Yamada Hirozi, published in Fujitsu Sci. Tech. J., Vol. 46, No. 1, pp 95-102, as well as from various patent applications such as U.S. Pat. Nos. 7,684,593 and 7,734,417.

The captured images of the multiple cameras are transformed using co-ordinate transformations to a viewing point above the vehicle based on ground projection. A computer generated vehicle overlay image is superimposed onto this projected image.

A bird's eye view system typically consists of fish eye (wide angle) cameras mounted on the periphery of the vehicle (e.g. four cameras mounted on the front, right, rear and left sides of the car). These camera images are corrected for fish eye distortion. The distortion-corrected images are transformed and projected in such a way that the observation point is above the vehicle. The projected images are stitched together in such a way that a seamless view of the surroundings of the vehicle is obtained. This around view is further processed to improve the picture quality and displayed in the cabin of the driver to assist the driver.

It is also desirable to be able to warn the driver if the distance to remote objects is becoming dangerous as well as showing the objects on the display. Approaches for identifying and marking the information on the display in bird's eye view parking assistance systems are known. For example, position information can be provided based on ultrasonic obstacle marking schemes as disclosed in US2010/0259371, and then used to provide a visual alarm warning on the displayed image. This approach combines the two known categories of parking assistance system, of image processing to generate a bird's eye view display, and of ultrasonic based sound alarms.

Conventional ultrasonic based systems can only provide the radial distance of an obstacle from the ultrasonic sensor mounted on the car, so the driver does not have a clear idea of the actual distance between the car bumper and the obstacle. Also the direction in which the obstacle is present is also not known. In the case of bird's eye view based parking assistance systems, the driver can see where the obstacle is, but it is hard to visually estimate the distance from the obstacle or from signal markings such as parking line markings on the ground.

Systems which are based on a combination of both bird's eye view and ultrasonic means give the visual information as well as the distance information. However such systems are costly since both of the devices need to be implemented. Also, the need to interface between these two schemes makes the system implementation complex. The interfacing to the ultrasonic sensor system will also add some delay in the overall processing which may not desirable in critical driving conditions.

Another issue with ultrasonic means of distance calculation is that it is difficult identify the obstacles when there are many of them. Also it is difficult to identify the distance to line markings on the ground since the ultrasonic means may not detect these, marking it difficult for the driver to park the vehicles in designated parking areas.

According to the invention, there is provided a vehicle parking assistance system, comprising:
  a display having an input interface for identifying a display screen location;
  an image processing unit, adapted to:
    process multiple images which comprise views in different directions around the vehicle;
    combine the multiple images to form a bird's eye view; and
    superimpose an image representing the vehicle into the bird's eye view; and
  a processor adapted to:
    calculate the distance between a location represented on the display at display location which has been identified by a user and a point around the edge of the vehicle; and
    present the calculated distance to the user.

The invention enables a distance calculation to a point of interest in a simple and cost effective way. The accurate positioning information provided improves the driver experience and ease of parking. By using identification of objects based on an input interface of the bird's eye view display device, the user is fully aware of the object being investigated, so that there is no ambiguity which can arise with systems which simply issue a warning signal.

The invention also enables the distance to multiple obstacles to be calculated, including road markings on the ground, since these will also be displayed in the bird's eye view image. Indeed, any object in the bird's eye view image can be selected.

The invention is easy and cost effective to implement and enables fast display of positioning information because the required processing is simple, for example simply based on a pixel comparison between the pixel location of the touch input and the pixel profile of the vehicle boundary.

The input interface for identifying a display screen location can comprise the display screen having a touch sensitive input surface. This provides an easy and fast way to identify a screen location. However, other methods may be provided, for example a joystick which moves a cursor around the screen. The joystick can have a press function for making a selection once the desired location has been chosen.

The processor is preferably adapted to control the image processing unit to present the calculated distance to the user as an image overlay. This provides an easy interface for the user, as he/she is already looking at the screen to make the location selection.

The processor can be is adapted to control a speaker system to present the calculated distance to the user as an audible message. This can be instead of or in combination with the image overlay.

A set of cameras is preferably provided for generating the multiple images.

The processor can be adapted to calculate the distance between a set of locations represented on the display at display locations which have been identified by a user and respective points around the edge of the vehicle edge and present the calculated distances to the user. This means that multiple objects or spatial locations can be monitored by the user.

The processor can be adapted to:

derive a distance between the display location which has been identified by the user and the point around the edge of the vehicle as a distance expressed as a number of pixels; and convert the distance expressed as a number of pixels into a physical distance using a pixel to distance conversion factor.

This provides a simple distance measurement, based on converting pixel spacings into real world distances.

The invention also provides a method of controlling a vehicle parking assistance system, comprising:

processing multiple images which comprise views in different directions around the vehicle;

combining the multiple images to form a bird's eye view;

superimposing an image representing the vehicle into the bird's eye view;

displaying the bird's eye view on a display having an input interface for identifying a display screen location;

receiving an input to the display from the user, which identifies a display location;

calculating the distance between a location as represented on the display at the display location and a point around the edge of the vehicle; and presenting the calculated distance to the user.

Examples of the invention will now be described in detail with reference to the accompanying drawings, in which.

The invention provides a vehicle parking assistance system based on presenting a bird's eye view. The display has an input interface, such as a touch-input display, and by providing an input to the display at a desired position (which is presenting an image of an object or location in space for which the driver is wanting to know the range), the user is able to request a distance calculation between the vehicle and that location in space. The distance information can be provided as an audible message and/or as a visual overlay message onto the bird's eye view.

Figure 1:
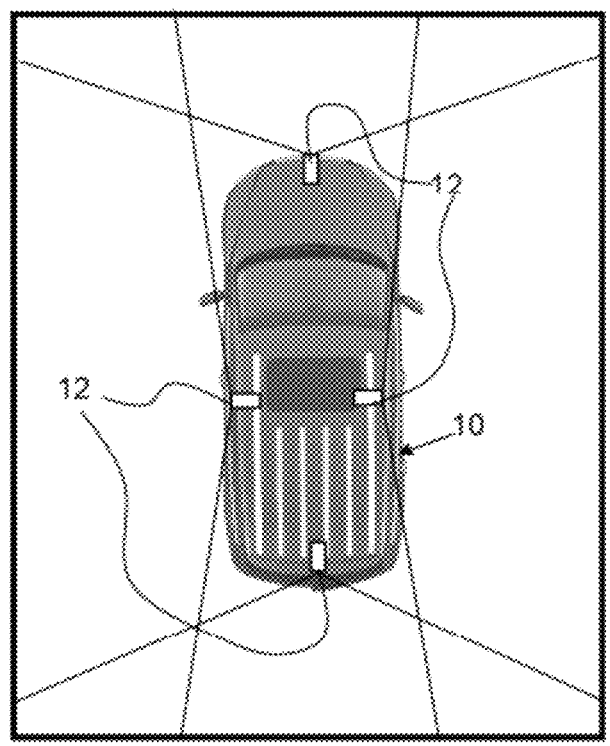
FIG. 1 shows a known parking assistance system.

FIG. 1 shows a typical bird's eye view system. The vehicle is shown as 10 and four cameras 12 are mounted on the vehicle, at the front and rear and at each side.

Figure 2:
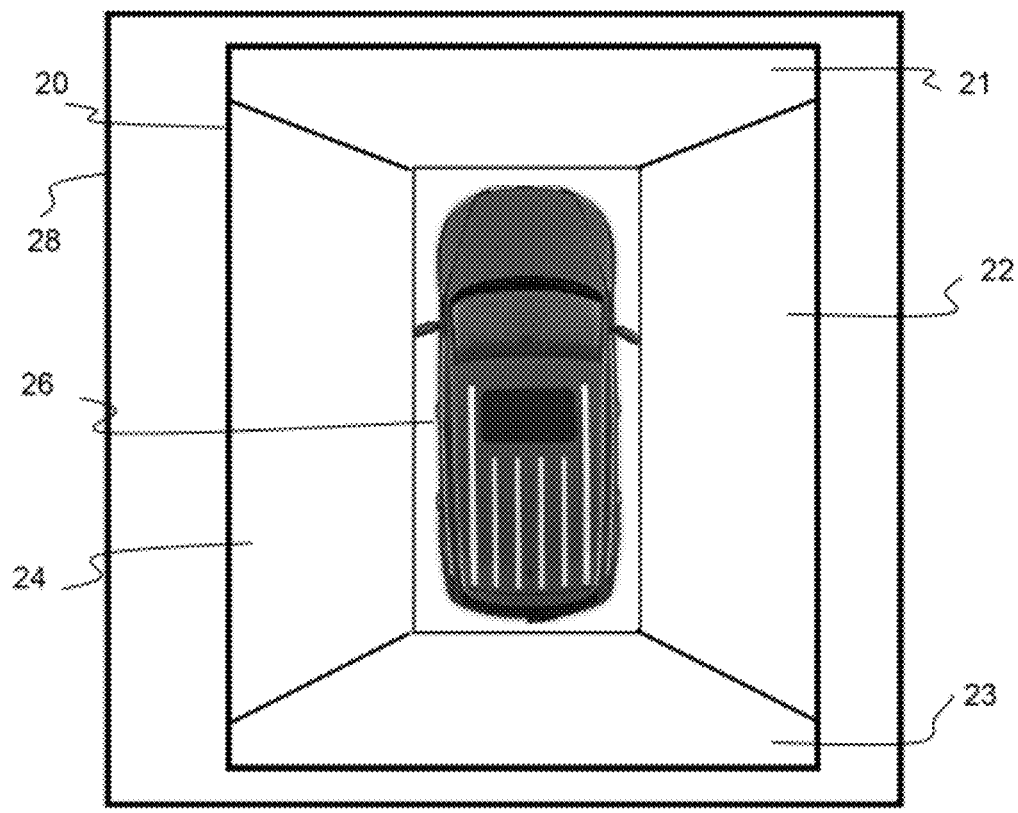
FIG. 2 shows the bird's eye view generated by the system of FIG. 1.

The basic principle is that the fields of view (FOVs) of the four cameras need to connect. The area surrounding the vehicle has to be entirely covered by the fields of view within a certain distance (for example two meters) of the car. This means that the FOVs of any adjacent cameras need to overlap significantly. The images of all four views are processed in real-time and are displayed as a stitched bird's eye view by a display system as shown in FIG. 2.

The bird's eye view is indicated as 20. The front, right, rear and left views are indicated as 21,22,23,24. The graphical overlay 26 of the car is in the centre of the bird's eye view 20.

Figure 3:
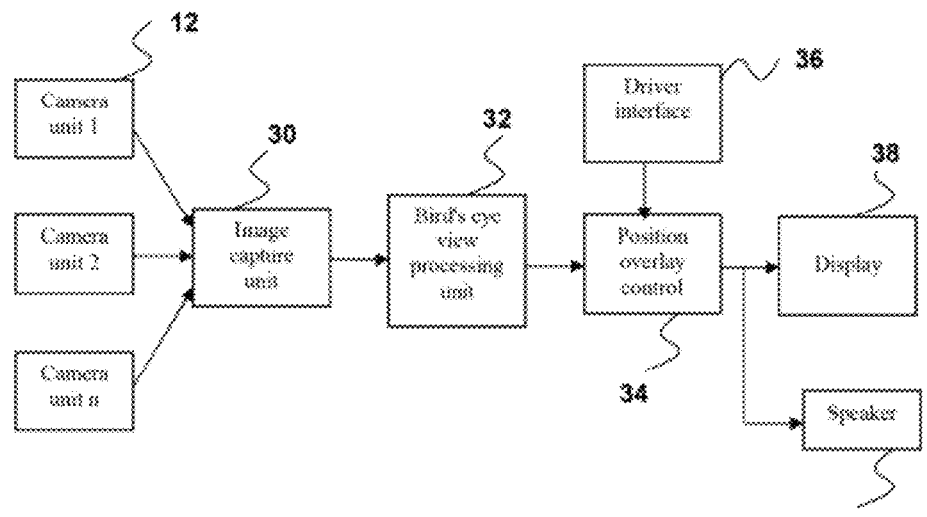
FIG. 3 shows a functional block diagram of an example of bird's eye view based parking assistance system according to the invention.

FIG. 3 shows a functional block diagram of an example of bird's eye view based parking assistance system according to the invention.

Images output by the camera units 12 are captured using an image capture unit 30. The images are processed to create a bird's eye view in the bird's eye view image processing unit 32. Overlaying of position information, in the form of distance information, on the bird's eye view is controlled by a position overlay control unit 34.

Inputs for the configuration of the position overlay are provided by a driver interface unit 36. The driver interface unit 36 captures and processes control inputs from the driver, including commands to provide an overlay giving distance information in accordance with the invention.

The preferred implementation uses a touch screen, but the driver can provide such inputs by using remote controls instead, such as a joystick for moving a cursor.

The bird's eye view output with the position overlay superimposed is displayed on the display unit 38. The position information can also be output as voice information through an optional speaker system 39. It is also possible to use only an audible message, and to leave the image as it is.

The processing of bird's eye view, position overlay and control logic can be implemented in DSPs or ASIC or FPGAs.

Multiple modes of the position overlay can be provided. For example, there may be a display mode in which a grid pattern is present in the bird's eye view, a display mode in which a grid pattern is provided only at specific places in the bird's eye view output, and a display mode with no grid.

The overlay creation can also be controlled by monitoring the state of the vehicle and can provide different display output modes without driver input. Examples of vehicle state parameters are:

direction of movement, speed of car, gear of the vehicle (e.g. drive/reverse).

This approach can be used to provide a grid overlay as explained above, which is controlled automatically. For example, when the vehicle is taking a left turn, the grid pattern could be displayed in the region of interest (namely at the front and left areas).

The identification of a state is carried out by sensors mounted on the car, and such sensors are well known for other control and monitoring purposes. Thus, existing sensors can be used to provide information to the parking assistance system. The direction of the vehicle can for example be identified using steering angle sensors.

The system of the invention uses position and distance information extracted from the inherent bird's eye view processing stages to generate the position overlay information. In this way, there is no additional overhead involved in interfacing to external sensor interfaces such as ultrasonic devices.

In bird's eye view systems, the output on the display screen has a fixed pixel resolution, for example 800 horizontal pixels×480 vertical pixels. The pixel resolution can be calibrated to show a specific distance, such as 2 meters or 3 meters around the car. The number of pixels per meter within the bird's eye view can thus easily expressed as:

$$\text{Pixels/Meter} = \text{bird's eye view output width (pixels)} / \text{real world distance } (m)$$

Figure 4:
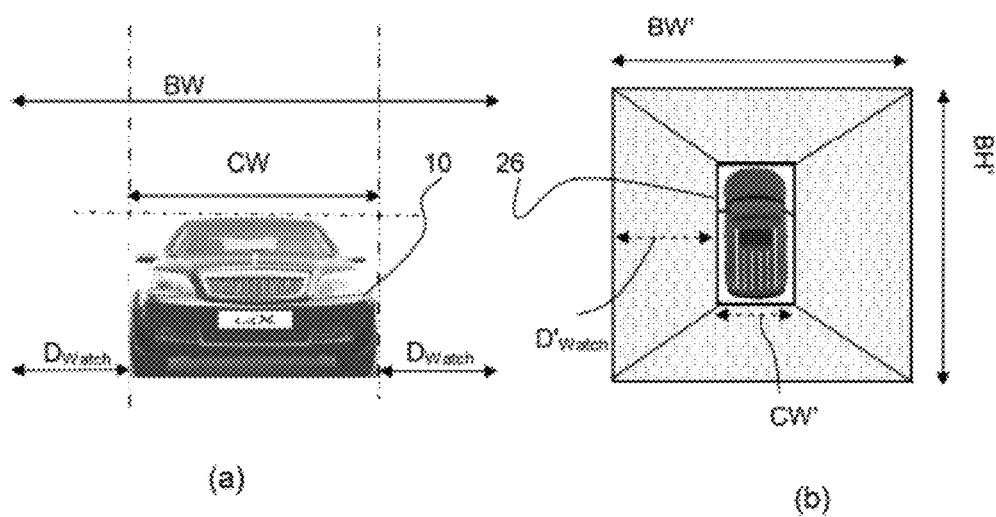
FIG. 4 shows the bird's eye view output and shows dimensions used to explain the operation of the system of the invention.

FIG. 4 shows the bird's eye view output width as BW' and the bird's eye view output height as BH'. These can be expressed as a number of pixels.

FIG. 4a shows the car 10 and distance around it to be viewed in the bird's eye view. The car has a width "CW", and the lateral viewing distance "$D_{watch}$" is shown, which may for example be between 2 m and 3 m.

FIG. 4b shows the bird's eye view output displayed on the display screen which includes the car overlay area 26 and the lateral viewing distance $D_{watch}$ as viewed on the screen. Similarly, FIG. 4b shows the car width CW as viewed on the screen.

The bird's eye view covers an area around the vehicle giving a width BW. This is the lateral distance of the area to be presented in the bird's eye view, including the car, expressed in meters.

This width is clearly expressed as:

$$BW=CW+2D_{Watch}$$

The bird's eye view display width BW' is the number of pixels used to display the width BW.

The value of Pixels/Meter can be expressed as:

$$Pixels/Meter=BW'/(CW+2D_{Watch})$$

Where CW and $D_{Watch}$ are expressed in meters and BW' is expressed in pixels.

Alternatively, the Pixels/Meter value can of course also be derived using the bird's eye view height parameter as:

$$Pixels/Meter=BH'/(CL+2D_{Watch})$$

Where CL is the car length and is expressed in meters and BH' is expressed in pixels.

Once the bird's eye view output is calibrated to show the required area, the Pixels/Meter value remains the same and hence this metric can be used for overlaying the position information.

In the system of the invention, position information available from the bird's eye view projection algorithm can be utilized to derive distance information for display or audio output. In a preferred implementation the system displays distance overlay information superimposed on the bird's eye view output.

The invention avoids the needs for additional distance estimation techniques such as ultrasonic schemes.

The system of the invention allows the driver to select any object/obstacle in the bird's eye view output whose distance from the car needs to be known. The system then displays the distance to the selected object superimposed on the bird's eye view output as an overlay graphic.

Figure 5:
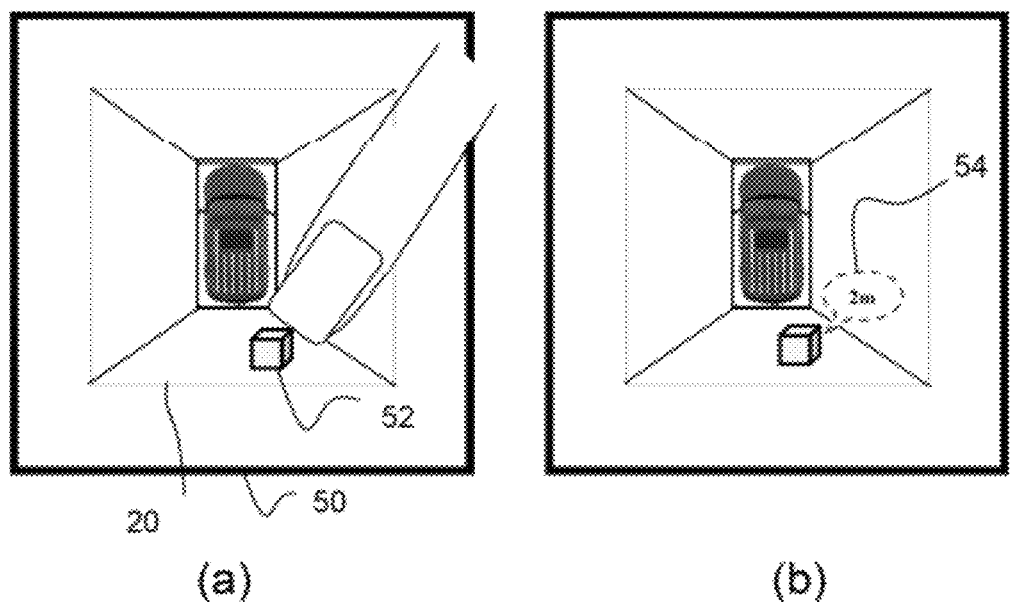
FIG. 5 is used to explain the user interface of the system of the invention.

The preferred user interface will be explained with reference to FIG. 5.

In FIG. 5a, the bird's eye view output 20 is displayed on a touch screen based LCD monitor 50. An object 52 is shown in FIG. 5(a). The LCD display of the bird's eye view system is typically placed in the driver's cabin of a vehicle within reach of the driver, such that the driver can look at the display while driving/parking for assistance, and can also provide input commands.

Assuming the vehicle is moving in reverse gear, when the driver sees that there is an object/obstacle 52 at the rear side of the car, he touches (as shown schematically) the touch screen LCD screen on the image of the object in the bird's eye view.

The touch screen system generates pixel co-ordinate estimates corresponding to the location on the display screen touched by the user (as is conventional). Based on the identified co-ordinates corresponding to the obstacle position in the bird's eye view image, the distance from the rear edge (e.g. bumper) of the car to the object can be calculated using the Pixel/Meter metric formulated as part of the bird's eye view processing.

Once the distance (e.g. in meters) is identified by the control logic of the system, the distance information can be displayed as an overlay superimposed on the screen for the attention of the driver.

In FIG. 5b, the position overlay is shown as a callout 54 in which a distance of 2 meters is marked. This implies that the distance of the obstacle identified by the driver from the car's rear side bumper is 2 meters.

Figure 6:
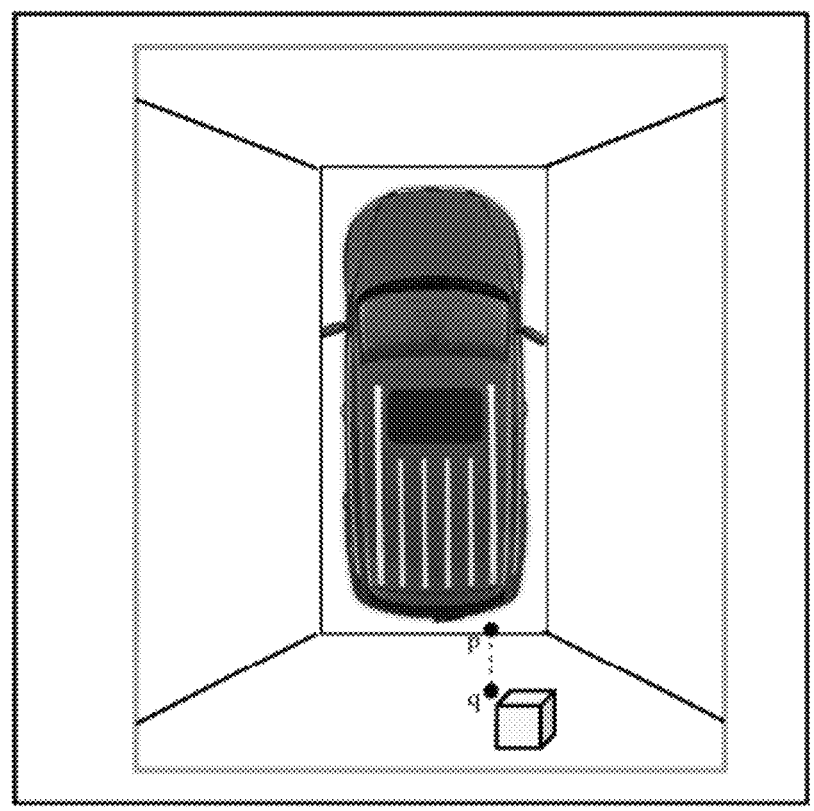
FIG. 6 is used to explain the obstacle distance calculation used in the system of the invention.

The obstacle distance calculation is further explained with reference to FIG. 6.

Let p(x1, y1) be the co-ordinates of a reference point on the rear bumper. Let the identified object co-ordinates (the co-ordinates of the position in the touch screen at which the driver touched the screen) be q(x2, y2). Both (x1, y1) and (x2, y2) are pixel co-ordinates. The distance in pixels (along the Y direction) of the object from the car reference is the difference (y2−y1) pixels. Distance in meters is $$(y2-y1)/(Pixel/Meter).$$

In this example, the object is on the rear side of the car and the reference point selected is the rear part (bumper) of the car. Similarly other reference points can be selected for the distance calculation. The reference points can be selected based on which side of the car is the object/obstacle is seen (e.g. if the obstacle is on the left side of the car, left edge of the car body such as left side mirror location can be selected as reference), or based on the direction in which the car is moving.

The overlay can be active for a specific duration on the screen (such as a few seconds) after which it disappears from the screen.

There are many ways to calculate the distance. With the vehicle image always vertical as shown, the shortest distance to the side of the vehicle will always be simply an x coordinate (since the x axis is normal to the side of the vehicle). Similarly, the shortest distance to an end of the vehicle will always be simply a y coordinate (since the y axis is normal to the end of the vehicle). Thus, only four reference points are needed. Indeed, each reference point only needs to identify an x-co-ordinate or y-coordinate value (thereby defining a line).

In addition to the basic operation explained above, the driver can select multiple objects on the screen and corresponding overlays can be displayed simultaneously. Each of the objects can be identified uniquely since the object is selected by the driver himself. The duration for which the overlay needs to be displayed can be set by the control logic.

In addition to objects in danger of being hit by the vehicle bumper or body, the driver can also identify traffic markings on the ground such as markings identifying parking bays. Knowing the distance to the parking bay boundaries can be useful while parking. Known distance calculation schemes such as ultrasonic based systems cannot identify road markings.

In a modification (and as mentioned above), the distance information can be conveyed to the driver by audio output, such as by voice synthesis. The calculated distance is then played to the speaker system. In this case, the driver doesn't have to look on the screen for more time to read out the position information as it is communicated by voice.

Figure 7:
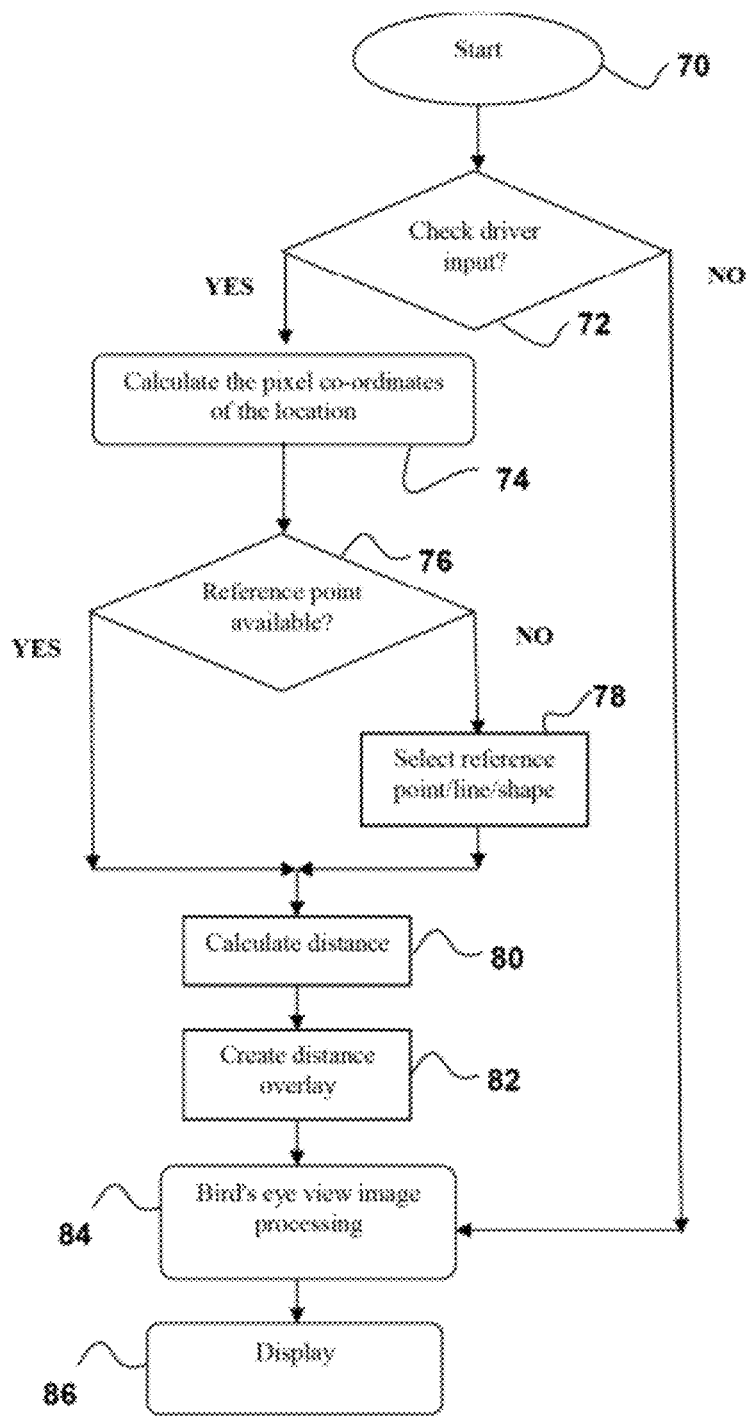
FIG. 7 shows a flow chart of the control logic of the distance overlay scheme of an example of the invention.

A flow chart of one example of control logic of the distance overlay scheme of the present invention is provided in FIG. 7.

The process starts with step 70. In step 72, the control logic checks for any driver touch-screen input.

If there is an input from the driver by touching the screen to locate an object (or by cursor movement and selection if touch input is not provided), the pixel co-ordinates of the location are calculated in step 74. Once the co-ordinates of the object location are identified, the next step is in checking if there are known reference points at the car boundary from which the distance needs to be calculated (step 76). If there are no predefined reference points available, then reference points are obtained in step 78.

The need for reference points can be avoided by calculating the shortest distance to any point of the vehicle boundary. The vehicle boundary profile is then stored in memory for this purpose.

However it may be an advantage to be able to select reference points, by the user. For example, there may be a more relevant reference point than the point around the vehicle boundary corresponding to the shortest distance. For example, for the case of objects which are of low height or in the case of markings on the ground, having a point on the main body of the car may be more relevant than the shortest distance point—which may for example be the edge of the side mirror, if the object/obstacle is on the side of the car. When parking the vehicle between two other vehicles, the side mirror could be a more relevant reference point than the body panels, since the side mirror can in that case make contact with the obstacle.

A reference point can be obtained by selecting a position on the particular side of the vehicle at which the object is located. Instead of a reference point, a reference line can be defined, for example the left side of the car.

A predefined reference point in step 76 can be one selected by the user, and if there is not one, then a reference point or line or shape is automatically selected in step 78—for example a side or end of the vehicle, or the reference point selection may involve using the entire periphery of the vehicle so that the shortest distance is obtained.

The distance calculation is carried out in step 80.

To simplify the processing, the left and right sides of the vehicle can be considered as straight lines. The distance of a lateral object is then simply the x-axis difference to the x-axis coordinate of the straight line. The sides of the vehicle can then be represented as a single x-axis pixel value.

The front and rear ends of the vehicle can also be considered as straight lines. In this case, the distance of a front or rear object is simply the y-axis difference to the y-axis coordinate of the straight line. The front and rear of the vehicle can then be represented as a single y-axis pixel value. Diagonal distances can be calculated when the object point is diagonal from the vehicle (i.e. the x-axis location is beyond the left or right of the vehicle profile and the y axis location is beyond the front or back of the vehicle).

This represents the outline of the vehicle as a rectangular box, which is of course only an approximation. Thus, a compromise can be found between the accuracy of the system and the computation effort. A simplified model of the vehicle boundary can be used, in combination with the ability for the driver to select a reference point more accurately, for example the wing mirror. A more accurate model of the vehicle boundary can still also be combined with the ability for the driver to select a reference point.

The visual overlay corresponding to the selected object and calculated distance is created in step 82. The bird's eye view processing is carried out in step 84 and the bird's eye view output superimposed with the overlay is displayed by the display system in step 86.

If there is no driver input, the overlay creation steps are bypassed, and the process jumps from step 72 to the bird's eye view processing, which is then carried out in conventional manner.

The invention provides a simple position/distance calculation scheme for displaying distance overlay in a bird's eye view system. The system enables multiple objects to be identified including road markings on the ground. The distance to these multiple objects can then be calculated from the reference points (either automatically set or set by the user) at the car boundary.

The invention can be used as part of a driving assistance aid, for example for parking assistance systems for vehicles.

The method of the invention can be implemented as software, as a modification to the existing image processing algorithm. Indeed, the image processing and distance calculation processing will most preferably be carried out by the same processor. The software is run on the main processor of the system which also implements the user interface functions. The computer program may be stored/distributed on a suitable medium, such as an optical storage medium or a solid-state medium supplied together with or as part of other hardware, but may also be distributed in other forms, such as via the Internet or other wired or wireless telecommunication systems.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A vehicle parking assistance system, comprising:
a display screen having an input interface for identifying a display screen location;
an image processing unit, adapted to:
process multiple images which comprise views in different directions around a vehicle;
combine the multiple images to form a bird's eye view on the display screen; and
superimpose an image representing the vehicle into the bird's eye view on the display screen; and
a processor adapted to:
calculate a distance between a location represented on the display screen at a display screen location and a point around an edge of the vehicle, wherein the display screen location has been identified by a user through interaction with the input interface of the display screen; and
present a numerical representation of the calculated distance to the user.

2. A system as claimed in claim 1, wherein the input interface for identifying a display screen location comprises the display screen having a touch sensitive input surface.

3. A system as claimed in claim 1, wherein the input interface for identifying a display screen location comprises at least one of a remote control device, a joystick, and a moving cursor.

4. A system as claimed in claim 1, wherein the processor is adapted to control the image processing unit to present the numerical representation of the calculated distance to the user as an image overlay.

5. A system as claimed in claim 1, wherein the processor is adapted to control a speaker system to present the numerical representation of the calculated distance to the user as an audible message.

6. A system as claimed in claim 1, further comprising a set of cameras for generating the multiple images.

7. A system as claimed in claim 1, wherein the processor is adapted to calculate a distance between a set of locations represented on the display screen at display screen locations which have been identified by the user and respective points around the edge of the vehicle edge and present the numerical representations of the calculated distances to the user.

8. A system as claimed in claim 1, wherein the processor is adapted to calculate distance for a region of the display in which the region is identified based on sensor input, and present the calculated distance to the user as a grid pattern as superimposed on the image at the identified region.

9. A system as claimed in claim 1, wherein the processor is adapted to:
- derive a distance between the display location which has been identified by the user and the point around the edge of the vehicle as a distance expressed as a number of pixels; and
- convert the distance expressed as a number of pixels into a physical distance using a pixel to distance conversion factor.

10. A method of controlling a vehicle parking assistance system, comprising:
- processing multiple images which comprise views in different directions around a vehicle;
- combining the multiple images to form a bird's eye view;
- superimposing an image representing the vehicle into the bird's eye view;
- displaying the bird's eye view on a display screen having an input interface for identifying a display screen location;
- receiving an input to the display screen from the user through interaction with the input interface of the display device, wherein the user input to the display screen identifies a display screen location;
- calculating a distance between a location as represented on the display screen at the identified display screen location and a point around the edge of the vehicle; and
- presenting a numerical representation of the calculated distance to the user.

11. A method as claimed in claim 10, wherein the input is received as a touch input to a touch sensitive display.

12. A method as claimed in claim 10, further comprising presenting the numerical representation of the calculated distance to the user as one of an image overlay and an audible message.

13. A method as claimed in claim 10, further comprising calculating the distance between a set of locations represented on the display screen at display screen locations which have been identified by a user as touch inputs to the display screen and respective points around the edge of the vehicle edge and presenting the numerical representation of the calculated distances to the user.

14. A method as claimed in claim 10, further comprising:
- deriving a distance between the display screen location which has been identified by the user and the point around the edge of the vehicle as a distance expressed as a number of pixels; and
- converting the distance expressed as a number of pixels into a physical distance using a pixel to distance conversion factor.

15. A non-transitory computer readable storage medium that stored computer readable code, which when executed by a processor performs the steps of claim 10.

* * * * *